(12) United States Patent
Speck

(10) Patent No.: US 10,928,929 B2
(45) Date of Patent: Feb. 23, 2021

(54) METHOD FOR DISPLAYING A VIRTUAL INTERACTION ON AT LEAST ONE SCREEN AND INPUT DEVICE, SYSTEM AND METHOD FOR A VIRTUAL APPLICATION BY MEANS OF A COMPUTING UNIT

(71) Applicant: FAINDU GMBH, Zug (CH)

(72) Inventor: Marc Speck, Zug (CH)

( * ) Notice: Subject to any disclaimer, the term of this patent is extended or adjusted under 35 U.S.C. 154(b) by 183 days.

(21) Appl. No.: 15/311,525

(22) PCT Filed: May 12, 2015

(86) PCT No.: PCT/EP2015/060527
§ 371 (c)(1),
(2) Date: Nov. 16, 2016

(87) PCT Pub. No.: WO2015/173271
PCT Pub. Date: Nov. 19, 2015

(65) Prior Publication Data
US 2017/0083115 A1    Mar. 23, 2017

(30) Foreign Application Priority Data

May 16, 2014   (DE) .................. 10 2014 106 960.9

(51) Int. Cl.
*G06F 3/0346* (2013.01)
*G06F 3/01* (2006.01)
(Continued)

(52) U.S. Cl.
CPC ......... *G06F 3/0346* (2013.01); *G02B 27/017* (2013.01); *G06F 3/011* (2013.01);
(Continued)

(58) Field of Classification Search
CPC ........ G06F 3/011; G06F 3/0346; G06F 3/014; G06F 3/017; G06F 3/0383;
(Continued)

(56) References Cited

U.S. PATENT DOCUMENTS 8,823,639 B2 * 9/2014 Jackson ................ G06F 3/0425
                                                        345/156
9,690,370 B2 * 6/2017 Levesque .............. G06T 19/006
(Continued)

FOREIGN PATENT DOCUMENTS

DE      102006037156      9/2007

*Primary Examiner* — Kenneth B Lee, Jr.
(74) *Attorney, Agent, or Firm* — JMB Davis Ben-David

(57) ABSTRACT

The invention relates to a method of representing a virtual interaction on at least one screen by means of a computer unit, comprising at least the following steps:
  representation of a virtual surface on at least one screen;
  representation of a position of a pointer by means of a defined deformation of the virtual surface (3) if the pointer is located on the virtual surface (3);
  displacement of the defined deformation upon a corresponding displacement of the pointer while the previously defined deformation is cancelled.
Furthermore, the invention relates to an input device for a virtual application, wherein the input device is designed as a ring and comprises at least the following components:
  a fastening device for fastening to a finger;
  a recording device for creating recording data of the relative position of at least one finger of a hand with respect to the input device and/or with respect to at least one further component of the hand and/or with respect to a real surface, if the activated input device is fastened to the hand by means of the fastening device;
  an internal computer unit for processing the recording data;
  a transmitter unit for sending the processed recording data of the computer unit, wherein by means of said recording data at least one corresponding virtual interaction can be generated by means of the internal and/or an external computer unit.
(Continued)

Figure 1:
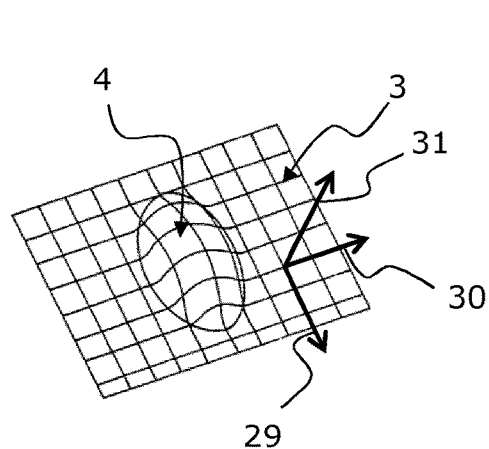

With the invention presented here, an autarkic and intuitive operation, in particular for applications in the field of augmented reality, can be implemented without the user being hindered in his other activities.

21 Claims, 3 Drawing Sheets

(51) Int. Cl.
    *G06F 3/0481* (2013.01)
    *G02B 27/01* (2006.01)
    *G06T 19/20* (2011.01)
    *G06T 17/20* (2006.01)
    *G06F 3/038* (2013.01)
    *G06K 9/00* (2006.01)

(52) U.S. Cl.
    CPC .............. *G06F 3/014* (2013.01); *G06F 3/017* (2013.01); *G06F 3/0383* (2013.01); *G06F 3/04815* (2013.01); *G06K 9/00355* (2013.01); *G06T 17/205* (2013.01); *G06T 19/20* (2013.01); *G06F 2203/0331* (2013.01); *G06F 2203/04801* (2013.01); *G06F 2203/04808* (2013.01)

(58) Field of Classification Search
    CPC ......... G06F 3/04815; G06F 2203/0331; G06F 2203/04801; G06F 2203/04808; G02B 27/017; G06K 9/00355
    See application file for complete search history.

(56) References Cited

U.S. PATENT DOCUMENTS

| | | |
|---|---|---|
| 2002/0123812 A1 | 9/2002 | Jayaram et al. |
| 2006/0119578 A1* | 6/2006 | Kesavadas ............ G06F 3/0481 345/161 |
| 2010/0107099 A1 | 4/2010 | Frazier et al. |
| 2010/0231505 A1 | 9/2010 | Iwata et al. |
| 2012/0192121 A1* | 7/2012 | Bonnat ................ G06F 3/0488 715/863 |
| 2013/0265300 A1 | 10/2013 | Vardi |

* cited by examiner

# METHOD FOR DISPLAYING A VIRTUAL INTERACTION ON AT LEAST ONE SCREEN AND INPUT DEVICE, SYSTEM AND METHOD FOR A VIRTUAL APPLICATION BY MEANS OF A COMPUTING UNIT

CROSS-REFERENCE TO RELATED APPLICATIONS

This is the U.S. National Stage of International Patent Application No. PCT/EP2015/060527, filed May 12, 2015, which was published in German under PCT Article 21(2), which in turn claims the benefit of Germany Patent Application No. 10 2014 106 960.9 filed May 16, 2014.

The present invention relates to a method for displaying a virtual interaction on at least one screen and with an input device, a system and method for a virtual application by means of a computer unit. Particularly preferably, the invention is used to interact with what is known as a Head Mounted Display (HMD), by means of which the field of view of the wearer of the HMD, the user, augments the reality in front of his eyes through virtual visual representations (AR: Augmented Reality). In the following, the virtual visual representations will only be designated as virtual representations, because the invention relates to the visual representation by means of at least one screen, for example, in the form of a Graphical User Interface (GUI).

Various input representations or interactive representations are known from the prior art, which comprise advantages and disadvantages respectively. For example, making inputs via a touch-sensitive screen (Touchscreen) is known, by which through more or less intuitive gestures a relatively simple operation of what is shown on the screen is permitted. Such an input has the advantage that no cursor is needed, therefore no graphical representation of the pointer, such as, for example, a mouse pointer, because the user's finger itself undertakes the interaction translated by the touchscreen in the field of view of the user. However, such an application requires firstly familiarisation with the sometimes complex gestures on the one hand, and is not transferable or only transferable in a limited way to applications without a screen in the natural radius of movement. Furthermore, the areas of the screen that the user touches are covered by the finger of the hand and possibly by the palm of the hand. This makes it more difficult to operate and sometimes requires learning the position of buttons of a GUI, for example, when operating a keyboard with a swiping technique, such as using Swype from Swype Inc.

Creating three-dimensional recordings of body parts or fixed infrared (IR) markers on body parts with cameras, sometimes infrared (IR) cameras, particularly at least by one hand, that allows a realtime control of a GUI is also known. Together with a motion model, the images are converted into a virtual representation of the recorded body parts. This technique has two major disadvantages. Firstly, the cameras are arranged at a fixed location and the user has to move in this field of view. Secondly, the recorded body parts are currently represented by unsuitable representations, for example of the body parts themselves or a usual cursor symbol. Such representations make it difficult for the user to act with this representations in the virtual environment and particularly require a learning process.

A helpfully improved 3D interaction option is a locally-independent product that is fitted to the wrist. In one variant the movement of the finger is determined by means of (a) camera(s). In a further variant, the bending of the finger is determined indirectly by means of ultrasound measurement of the flexor tendons of the hand that run bundled through the carpal tunnel. In both variants, a movement model of the hand is stored. Unfortunately, these devices are bulky and cumbersome for the other (real) activities with the hand and/or deficient because of a limited motion capture, for example due to occlusions (covering the field of view).

Only recently has a marketable product been introduced that can be implemented in the form of a finger ring on the index finger and records a relative change of position of the hand or index finger by means of motion sensors. This finger ring that is marked by Nod Inc. under the name Nod also exhibits a side touchpad, to achieve an input. However, this finger ring differs from the already long known Wii™ remote control from the company Nintendo® simply by the form of being wearable on the finger. The input representation associated herewith is traditional and comprises the disadvantages illustrated above of the need to learn the gestures and the limitation of operation that entails. Also, the finger ring only reproduces the absolute movement of the ringed finger, therefore reproducing the movement of the entire hand with a single finger ring and generally the ringed phalanx proximalis.

The disadvantages illustrated here of the known prior art are at least partially solved by the invention described in the following. The features according to the inventions are stated in the independent claims, for which advantageous embodiments are stated in the dependent claims. The features of the claims can be combined in any technically reasonable way, wherein also the explanations from the following descriptions and the features from the figures, which comprise supplementary embodiments of the invention, can be used.

The invention relates to a method of representing a virtual interaction on at least one screen by means of a computer unit, comprising at least the following steps:

Representation of a virtual surface on at least one screen;
Representation of a position of a pointer by means of a defined deformation of the virtual surface if the pointer is located on the virtual interface;
Displacement of the defined deformation upon a corresponding displacement of the pointer while the previously defined deformation is cancelled, wherein the at least one pointer is generated by means of an input device for a virtual application by means of a computer unit, wherein the input device exhibits at least the following components:

A fastening device for fastening to a hand;
A recording device for creating recording data of the relative position of at least one finger of a hand with respect to the input device and/or with respect to at least one further component of the hand and/or with respect to a real surface, if the activated input device is fastened to the hand by means of the fastening device;
An internal computer unit for processing the recording data;
A transmitter unit for sending the processed recording data of the computer unit, wherein by means of the said recording data at least one corresponding virtual interaction can be generated by means of the internal and/or an external computer unit.

According to a further aspect of the invention a method of representing a virtual interaction on at least one screen by means of a computer unit, comprising at least the following steps is proposed:

Representation of a virtual surface on at least one screen, wherein the virtual surface comprises a coordinate system with an x-axis and y-axis in the virtual surface and a z-axis pointing out of the virtual surface;

Representation of a position of the pointer by means of a defined deformation of the virtual surface, if the pointer is located on the virtual surface, wherein this defined deformation comprises a two-dimensional extent in the x-direction and in the y-direction and an extent in the z-direction, wherein this defined deformation is only used to display the position of the pointer;

Displacement of the defined deformation in the x-direction and/or y-direction upon a corresponding displacement of the pointer in the x-direction and/or y-direction while the previously defined deformation is cancelled.

It should be pointed out here, that the coordinate system is preferably not displayed and that it is preferably Cartesian. It should also be pointed out that the virtual surface according to one embodiment is a flat plane or at least uneven in some areas and therefore exhibits a curvature, an inclination or similar, for example. The orientation of the axes can respectively be adapted so that the z-axis points vertically out of the virtual surface. In an alternative embodiment, only the representation of the surface is uneven and the orientation of the coordinate system remains constant.

For details on this, refer to the following description.

According to a further aspect of the invention, the invention relates to a method of representing a virtual interaction on at least one screen by means of a computer unit, which comprises at least the following steps:

Representation of a virtual surface on at least one screen;

Representation of a position of a pointer by means of a defined deformation of the virtual surface if the pointer is located on the virtual surface, wherein this defined deformation is only used to indicate the position of the pointer;

Displacement of the defined deformation upon a corresponding displacement of the pointer while the previously defined deformation is cancelled.

Preferably the virtual surface comprises a coordinate system, preferably a Cartesian one, with an x-axis and y-axis in the virtual surface and a z-axis pointing out of the virtual surface. Furthermore, the defined deformation preferably comprises a two-dimensional extent in the x-direction and in the y-direction and an extent in the z-direction. For example, the defined deformation is displaced in the x-direction if a displacement of the pointer is made in the x-direction, wherein the previously defined deformation is cancelled. For example, the defined deformation is displaced in the y-direction if a displacement of the pointer is made in the y-direction, wherein the previously defined deformation is cancelled. The relevant amount of movement of the defined deformation and the corresponding amount of movement of the pointer are preferably mutually proportional.

With the method proposed above, which can be, as a computer program or stored on a computer program product, executed on a modular computer with at least one processor, as the case may be at least one memory unit, as the case may be at least one working memory and at least one user interface, a particularly simple and intuitive interaction with a virtual interface can be enabled.

The respective method represents a novel operation display for a user which is particularly suitable for input by means of a finger or by means of a plurality of fingers. In the prior art, frequently what is known as a cursor is used to represent the pointer, which is mostly not easy to find and only marks a single point at the same time. A translation of the representation of a pointer as a cursor on a plurality of pointers is frequently not possible without demanding from the user to learn the operation.

Here, it is now proposed to deform the virtual surface, for example a GUI, a page of text or the outer view of a volume body, in the area of the pointer, for example, by indenting. For example, if the user grasps a virtual piece of paper, at least one finger deforms the paper. This appears on the screen as a deformation which is, for example, indented into the paper. For example, touching the piece of paper from the rear is possible, which is shown bulging outwards, for example, instead. The user then understands directly that the virtual surface has been virtually touched and can be manipulated. The pointer is represented by the deformation which therefore forms the cursor, and no additional cursor is needed and therefore, for this pointer, preferably no additional conventional cursor is displayed. In case of a pure indication of a position of the pointer, the deformation is not permanent, but is displaced relative to the coordinate system of the virtual surface, thus preferably in the plane of the surface. A section of the plane of the surface is flat or curved. An x-axis and a y-axis of a spanning coordinate system are in the plane of the surface and a z-axis points out of the plane of the surface. A displacement of the pointer is, or designates, preferably a displacement in the plane of the surface or parallel to the plane of the surface. If the plane of the surface exhibits a curvature, in one embodiment the z component of a movement is not considered; in another embodiment the deformation is larger (for example in an indentation or protrusion) or smaller (for example an indentation when raising), if the displacement of the pointer relative to the plane of the surface comprises a corresponding z component. Depending on the type of virtual object, both embodiments may also be implemented in combination, depending on the type of virtual surface. Particularly preferably, the deformation corresponds to a calculated depression, as would be left by a finger in a soft material. More particularly preferably, the defined deformation forms a bank. That means, the material penetrated to form a depression forms a protruding ridge on the edge of the deformation as this would occur particularly with incompressible (elastic) material, such as a rubber, for example.

The virtual surface exhibits a (virtual) elasticity. This means that the partial surface that was still deformed by the position of the pointer goes slowly or quickly back into the zero position, preferably momentarily, thus into the plane of the surface, which is present without the deformation by the pointer. This elasticity is, if this is useful and/or desired for the actual application, only able to be lifted by means of a manipulation. A manipulation is an interaction with the virtual object that changes the virtual object. The opposite to this is the position indication, in which the virtual object is not changed, but only the position of the relevant pointer is displayed by means of a defined deformation of the relevant virtual surface, which is cancelled when displacing the pointer (in the plane of the surface) and is shown in a new position, as the case may be, of the pointer. Therefore, the deformation is not the aim of the interaction but only the representation of the interaction. From the point of view of a programmer, the virtual object and its properties are not changed by the indication of position. Only the representation of the virtual object is overlaid with the deformation information. If, for example, a coordinate pixel is simulated with a virtual surface simulated with the coordinates $x=10$, $y=10$, $z=0$ of a virtual object, and a pointer is located at this position, a displaced representation ensues. For example, the pointer contains, at the relevant point at the relevant time the displacement information $\Delta x=+1$, $\Delta y=-1$, $\Delta z=-5$. Then the representation of this coordinate pixel changes to $x=11$, $y=9$, z=−5. If the pointer or a displacement information is removed again, the representation is depicted again without the overlay, therefore, as solely simulated by the virtual surface.

A possible representation of a deformation, preferably of at least one finger and/or a hand, on the screen is a shadowing which preferably reflects the shape of at least one finger and/or one hand. Depending on the object in the (virtual) environment of the pointer, the character of the deformation may be changed, particular in shape, size, lag, colour or texture.

Here is a comparative example for better understanding: The deformation corresponds to the usual mouse pointer, which can be moved by means of a computer mouse. For example, when the mouse moves over selectable text, the representation of the mouse pointer changes to a I-shaped line, so that the user knows that the text can be selected by holding down the left mouse button and then sweeping over it. In a similar way, the position of the pointer can be displayed in this case as a defined deformation which therefore corresponds to the mouse pointer, and no mouse pointer and no other representation is used for this. If the deformation is changed in the same place, for example, depressed, wherein this shape now corresponds to the I-shaped line of the computer mouse, the user then knows that it is now possible the manipulate the object. Staying with this example, a piece of text, by this change of representation of the deformation, would be selectable by sweeping over the text. Contrary to the comparative example, the changed deformation is actively resolved by the user and preferably also corresponds to holding down the left mouse button, for example, by means of a change of the z-coordinate of the pointer. In addition, or dependent on a virtual surface, a deformation may also be varied without input from the user, in order to indicate the possibility of a manipulation.

In contrast to purely displaying position, a possible virtual manipulation may comprise a gripping or pulling, for example, plucking, that just as with a real roll of dough leaves a plucked conical shape in the virtual surface. The manipulation may also comprise kneading with the deformation remaining. For many applications, a manipulation in the shape of discs, turning, pushing, pulling, scrolling, browsing, holding, gripping or similar is helpful. The virtual manipulation represents a sub-function of the virtual interaction, wherein the interaction, in contrast to the virtual manipulation, for example, can be restricted to the representation of the position (position indication) of at least one pointer.

More particularly preferably, a plurality of pointers is represented, wherein the pointers respectively comprise a changeable position. Each of the pointers are represented by a corresponding deformation. Preferably, in so doing, the characteristic of an input device generating the pointer, for example, a finger, is reflected by the deformation. For example, the size of the deformation and/or the relative position and the relative rotation of the pointer can be represented adapted to each other.

The deformation is displaced with the displacement of the pointer also in real time, or the position of a deformation is adapted to the appreciable speed of the human eye (within 100 ms [milliseconds] to several seconds) to the new position of the pointer and the previous deformation is cancelled. In so doing, preferably a path between the deformations is calculated by interpolation and accordingly displayed as a relaxing deformation trajectory. This deformation display is particularly useful for a plurality of pointers as, for example, is the case when using a hand as an input means.

Here, it is particularly advantageous that only a slight effect of the virtual surface nevertheless allows good feedback to the user, so that, for example, a piece of text can continue to be read well or the buttons of a virtual keyboard are always recognisable and remain unhidden.

It should be pointed out here that the method proposed here is particularly advantageous for usability in real time applications. In particular, the user is to obtain an (almost) delay-free reproduction of his interaction with the virtual surface, as this is the case, for example, with the current user applications with cursor. If the translation is not completely delay-free, either the user is given a corresponding instruction or the delay occurs in a (possibly not detected) acceptable timeframe, preferably in the range of milliseconds.

A particular advantage of the real time application is the continuous feedback of the user's action, which is particularly well received, because the representation by deformations is received as surprising and positive. The virtual interaction therefore feels like a real interaction and incites the play instinct in people. As a result, the virtual interaction becomes even more intuitive and may be operated at high precision.

The virtual interaction with a virtual surface may be restricted to a position indication. However, particularly by means of a GUI, background processes may also be triggered, which do not have to be shown directly to the user, for example, if the finger of the user approaches a link in an internet browser, the browser can load the page content of the link into the background.

According to an advantageous embodiment, when entering text by hand by means of a virtual keyboard, not only is the position of the touch of the fingertip on the (table) surface considered, but also the time curve of the movements of the finger, the spatial and temporal probability distribution of positions, speeds and accelerations of the knuckles and elements of the hand at the relevant time, the language context from the text analysis, the specific, learnt behaviour of the user and/or the noise of tapping the surface. The position of a button is therefore not rigidly anchored to a surface, but adapts, preferably dynamically, to the behaviour of the user.

According to an advantageous embodiment of the method, by means of a user input, the currently defined deformation is changed and/or frozen and this user input is translated into a corresponding virtual interaction.

The user input is, for example, a change of the position of the pointer in a direction normal to the virtual surface, for example, pushing in or pulling out, and therefore, for example, an exceeding of a distance limit. The deformation is therefore, for example, depressed or raised and/or the colour of the surface in the area of the pointer and/or the (previous) deformation is changed. In another example, the user swipes the pointer at an increased speed over the virtual surface and therefore generates a modified deformation deviating from the normal speed. For this, for example, a speed limit is set. No limits are set on the manner of changing the deformation by a user input, however, advantageously, effects in the real environment or already generally recognised, therefore learnt, interaction representations in the context of computer-aided applications shall be used. Therefore, the operation by means of the method proposed here is particularly intuitive.

The user therefore obtains a feedback of a possible interaction with the surface, for example, pressing a button of a virtual keyboard. The deformation is then, for example, changed contrary to natural physical deformations, for example, by colour and/or frozen in the current form and held for a preset time or until active resolution by the user in this deformation state. By means of the change of deformation, the user is given feedback of the present user input.

According to an advantageous embodiment of the method, a plurality of virtual surfaces is provided that form at least one virtual object, wherein a plurality of pointers is provided that are displayed respectively by a defined deformation, wherein upon a corresponding change of at least one of the defined deformations, the virtual object can be manipulated, preferably triggered by a user input by means of changed and/or frozen deformation according to the description above.

In this embodiment, a virtual object can be manipulated intuitively, wherein the virtual object appears to the user as a virtual representation of a real object, for example, a page of a book, dice or any other shape. To do this, a plurality of pointers are used that can have an effect individually or jointly on the virtual object. The corresponding change of at least one deformation is dependent on the property of the virtual object, that this object has been given by programming. The change is, in any case, for the user a clear indication that a manipulation can be or is done. To do this, it is particularly advantageous if the virtual object comprises a virtual weight and corresponding virtual forces have to be applied to manipulate the object. For example, a relatively heavy virtual block in the virtual environment would only be able to be pushed or lifted from its resting position with the use of several pointers. Or the virtual button of a virtual keyboard would be able to exhibit a virtual return spring which can only be deflected by applying a required virtual force and therefore only then the corresponding command of the button is triggered. Advantageously, the interaction with the virtual object is always represented visually to the user, preferably in real time. The manner of virtual manipulation and the necessary corresponding change of deformation by a user input are not set any limits, however, advantageously, effects in the real environment or already generally recognised, thus learnt, manipulation representations shall be used in the context of computer-aided applications. Therefore, the operation by means of the method proposed here is particularly intuitive.

Contrary to the previously known methods, here it is possible to process a plurality of pointers and display them to the user without the visibility of the object to be manipulated being concealed. In the prior art, with a simple cursor an interaction is undertaken only at one location or the visibility is concealed by the real hand or a representation of a virtual hand. On the other hand, interaction with several fingers now enables a plurality of interactions at the same time at the same or different locations. For example, the user can touch and manipulate a virtual colouring pen at several locations at the same time in a complex movement. With a cursor, he would be able to only touch the virtual colouring pen at one location at one time and would not be able to lift it once. A comparably complex motion is only enabled with a sensor pen, such as, for example, provided by the company Wacom Inc., wherein this is connected to an input surface at a fixed location. The use of a plurality of fingers therefore allows a clearly more complex variety of movements and very precise movements in a virtual environment.

According to an advantageous embodiment of the method, the defined deformation and/or the dwell time of the defined deformation is dependent on the virtual material property of the virtual surface, wherein the virtual material property is preferably able to be changed by the user.

Particularly intuitive is the operation by the assignment of virtual material properties to a respective virtual surface or a virtual object. For example, a surface that does not allow any operation could be formed from a rigid material, so that the user detects that no input is possible there. In other areas, on the other hand, a particularly soft, elastic material could be used, so that the user recognises that a manipulation is possible there. Depending on the desired user interface for the user, a mixture of different material properties can be used. Particularly preferably, the property of at least one virtual object can be changed by the user, which therefore, for example, prevents an inadvertent entry of a virtual interaction via a virtual object not standing right in the centre of attention by the user. For example, the user blocks a virtual keyboard and therefore prevents inadvertent input.

According to an advantageous embodiment of the method, a distance limit of the pointer to at least one surface is defined, wherein if the distance limit is undercut, the defined deformation is changed and when the pointer is displaced a virtual kinetic action is possible on the surface, and wherein when the distance limit is exceeded the surface is touched and leads to a displacement of the defined deformation relative to the surface.

A kinetic action on a surface preferably also comprises a kinetic action against the surface and/or with a surface. By means of this embodiment, for example, an intuitively understandable representation of grasping is possible, even without the user obtaining a tactile response by touching a virtual surface. In the following example, for better understanding, the deformed surface is defined as a flat x-y-plane of a Cartesian coordinate system, wherein the z-axis points out of the surface, for example, in the direction of the user, and has its origin at the intersection with the virtual surface. If the pointer is in a position in which the virtual surface cannot be manipulated, the surface in the area of the pointer is deformed in the shape of an indentation with, for example, a square centimetre surface with a maximum of −1 mm [millimetre] from the origin of the z axis, thus a depression is formed. This deformation is used in this example only to indicate the position of the pointer. If a manipulation from the user is desired, he moves the pointer along the negative z axis into the virtual surface, for example, by an amount of 1 mm. It ensues, for example, that the corresponding deformation is depressed a maximum of −2 mm. The visual response allows the user to recognise that he is now exerting sufficient virtual force on the virtual surface to manipulate the virtual surface. For example, the virtual surface will now follow his movement and can therefore, for example, be displaced. This means that, between the pointer and the virtual surface in this state, at least in the area of the deformation, no relative displacement occurs; for example, a virtual page of a book in this manipulation state can be leafed through by displacing the pointer. When the distance limit is exceeded, for example in case of the −2 mm towards the −1 mm, on the other hand, a relative displacement (shifting) occurs between the virtual surface and the deformation upon shifting of the pointer. Then the virtual surface is not manipulated and, in this example, is fixed in location in the virtual environment. Also, from the reaction of the virtual surface, the user obtains a response over the success of his intended input. Alternatively or in addition, the deformation changes colour when the distance limit is undercut, for example, as with transparent clear PMMA material that becomes milky under the induction of tension (as a result of a compression force) in the area of the deformation. In a particularly advantageous embodiment, a part of the surface which can be manipulated vibrates when the pointer sweeps over this part of the surface. Alternatively or in addition, a manipulatable part of the surface vibrates when first displaying the virtual surface.

According to an advantageous embodiment of the method, a part of the surface represents a switching device, wherein if the distance limit is exceeded a deformation is produced and/or if the distance limit is undercut according to the description above, the part of the surface produces a visual response.

The switching device is, for example, a virtual button, which when the distance limit is undercut is depressed as a whole. However, any other response such as, for example, a vibration, a change of material or similar can be triggered when the undercutting of the distance limit is triggered.

According to an advantageous embodiment of the method, the defined deformation is made by means of at least one finger.

In this preferred embodiment, a pointer is directly controlled by a finger of the user and the defined deformation indicates to the user the (relative) position of his finger in the virtual environment. For applications with one or more fingers as an input means in the prior art the at least one pointer is frequently represented as a representation of a finger or a hand. However, this representation is frequently appreciated as foreign and particularly unfavourably conceals much of the virtual surface. With the deformation proposed here as a translation of the corresponding pointer, the actual position in the virtual environment can be represented, without concealing anything. Furthermore, the deformation is appreciated as natural with a suitable representation and is accepted by the user as his interaction with the virtual surface.

The representation of position of the at least one finger by means of deformation may, as this is the case in the basic principle of a computer interface in form of a drawing board operation, be displayed, thus as a relative position in space to a defined input surface. Alternatively, the relative position of the finger to a defined interface may remain unnoticed and only the deviation from a defined starting point (for example in the initial time, for example when starting the computer system, the middle of the screen) is registered, as is the case with a mouse interaction.

Preferably, the defined deformation corresponds to the shape and size of a normal finger or the currently used finger, wherein, in the latter case, for example, for a child the deformation would be smaller than for an adult. For other applications, on the other hand, it is useful to be able to adapt the size of the deformation to the current application if, for example, a particularly fine processing is necessary.

According to an advantageous embodiment of the method, a plurality of fingers respectively causes a defined deformation and by means of the plurality of fingers at least one virtual object can be grasped.

In this advantageous embodiment a virtual object formed by at least one virtual surface, can be manipulated with the help of several pointers, wherein the pointers respectively represent one finger. This type of grasping is immediately understandable to the user without learning artificial gestures. The fingers are then, as described above, for example used by means of undercutting a distance value between the virtual object and the pointers representing the fingers in the form of defined deformations to grasp a virtual object. The virtual object is, for example, a GUI, a keyboard, a geometric shape, a virtual screen for displaying information in an AR environment or similar. The virtual interaction may be a displacement of the virtual object, an enlargement or reduction of a virtual object, inputting a command (pressing a button) or similar.

Furthermore, the invention relates to an input device for a virtual application by means of a computer unit, wherein the input device is preferably designed as a ring, wherein the ring comprises at least the following components:

A fastening device for accurately fitting the input device or the ring onto a finger;

A recording unit for creating recording data of the relative position of at least one finger of a hand with respect to the input device and/or with respect to at least one further component of the hand and/or with respect to a real surface, if the active input device is fastened to the hand by means of the fastening device;

An internal computer unit for processing the recording data;

A transmitter unit for sending the processed recording data of the computer unit, wherein by means of the said recording data at least one corresponding virtual interaction can be generated by means of the internal and/or an external computer unit.

The input device is provided to incorporate movements of a hand into an input into a computer-aided virtual environment in such a way that one can interact with this virtual environment. This means that, for example, an office application can be operated by typing with the fingers without a keyboard, drawing or modelling in a drawing application, browsing through virtual pages, computer game applications and many more can be operated by means of the input device by means of the hand. A pioneering advantage of this input device is that neither an external camera is needed nor does disruptive equipment have to be worn on the body. Furthermore, with this input device, a completely novel operation is possible, which will be presented in the following in the context of the method.

Compared with external input devices, such as cameras on a screen or in an HMD, it is not necessary to guide the hand into an (uncomfortable) field of view with the input device. Tiring and illness-causing continuous malpositions may therefore be avoided. In a preferred embodiment, different positions of the hand may even be selected for one and the same interaction. An advantage of the input device is that the hand can be held in the natural position. The joint system of the hand and the arms is loaded to a minimum, which can prevent or reduce illnesses such as carpal tunnel syndrome. This is even not possible with a touchpad or a computer mouse without restrictions. Furthermore, the input device is arranged close to the fingers, and particularly the index finger and the thumb, so that precise, fine movements can be recorded without too much technical effort and can be correspondingly converted into a virtual environment just as precisely and finely. This also allows a clearly finer interaction with a virtual surface, for example, for CAD applications or for editing photos. However, without limitations, normal positions that are already practised can be captured, such as typing on a keyboard, for example.

First of all the input device comprises a fastening device, by means of which the entire input device can be detachably fastened to the hand, preferably to a finger. This means that everything that the input device comprises is fastened to the hand, preferably to the finger. Preferably, the input device is formed so small or thin that it is not cumbersome for other, for example, everyday, thus for example, real hand movements.

Furthermore, the input device comprises a recording unit which is set up to create recording data of the relative position of at least one finger of the hand with respect to the input device and/or with respect to the at least one further component of the hand and/or with respect to the real surface, if the activated input device is fastened to the hand, preferably on the finger, by means of the fastening device. This means that the input device is set up by a correct fastening in such a way that the recording unit can create recording data from at least one finger. For example, the input device exhibits a visually and/or haptically appreciable marking for correct fastening, for example, a notch and/or a coloured label.

It should be pointed out here, that the recording unit is set up for recording, thus in the further sense for detecting, at least one part of at least one finger and, as the case may be, other components of the hand. This means that the shape situated in the recording area or initially the surface and its respective alignment-dependent reflection property are recorded. This recording data allows a geometric comparison with a virtual hand model.

The recording unit not (only) records distance, for example, according to the reflection principle of a sonar system. Preferably, distances are determined indirectly by the comparison with a hand model and size ratios of the recording data. The recording unit is therefore, in other words, set up to generate a type of map (of parts) of at least one finger.

The recording data allows, on the basis of a hand model, the detection of the relative position of at least one recorded finger relative to the input device and/or, if also a further component of the same hand, for example, a part of the palm or another finger or thumb is recorded, relative to at least one other component of the hand. If a change to the relative position of at least one finger is now detected, these movement data are, at least using a stored movement model of a hand, converted into input data. For example, a tipping movement of a finger is used as typing input on a virtual keyboard. For example, a stretching movement of a finger is used as a pressing input for a virtual button. For example, bending of one or more finger to the palm is used as a grasping movement to grasp a virtual object. In an advantageous embodiment, one or more sensors are arranged in the input device, which are set up to measure the distance to objects in the environment, for example, to a pen, to an eraser, to a table top and/or to one or more walls in the room. Simple sensors may use for distance measurement previously known methods such as, for example, triangulation or propagation time measurement of electromagnetic waves, particularly light waves or ultrasound waves. For example, with at least one image sensor, by stereo vision or by the detection of a pseudo-random light pattern a depth image can be created. The input device is preferably set up not only to detect the fingers of the wearing hand as relevant objects for a virtual interaction, but also objects in the immediate vicinity such as the table top or a pen or an eraser in the hand. The position of these objects relative to the input device or the recorded hand is then detected. If the user holds a pen in his hand, for example, a virtual pen is displayed on the screen, in an embodiment with the exact size and colour. If the user holds a pen in the hand, the input device is set up to detect the movement of the pen and to record text or drawings which are written (virtually or in reality) directly by the wearing hand. In an embodiment, the pen used comprises suitable sensors which continuously or at set intervals detect the position of the pen. In so doing, a suitable movement of the pen is detected and/or the change of position relative to at least one input device and/or with respect to at least one screen is detected. These objects may either be identified by object class (for example "pen") or specifically (for example "my red pen"). For identification, a camera of the input device or a sensor for and identifier in the pen, for example, a barcode, a near field communication (NFC) chip or similar can be used. In an embodiment, a screen such as a touchscreen can be used, which does not have any previously known touchscreen sensors, such as a capacitive or resistive touch sensor or a position recording camera. As soon as the position of the input device to the screen is known, the data of the input device enables the screen to be used as a touchscreen: As soon as one or more fingers touch the screen, this is interpreted as a touch event.

It should be pointed out here that for many positions of the at least one finger, the recording of part of the finger and/or even of another component of the hand are sufficient. The position of the at least one finger is determined by means of the recorded partial surface of the finger and/or components of the remainder of the hand by a comparison with a stored hand model. The selection of parameters from the hand model which are transmitted can be permanently adapted. Typically, the transmission of the position of the finger tips and the direction of the foremost finger joint are sufficient. The spatial and temporal probability distribution of positions, speeds and accelerations of the knuckles and elements of the finger and the hand may be included for the calculation of the hand model. The probability distributions may be adapted at any time on the basis of past movement processes. Such distributions may be stored in the input device, in the external computer unit and/or in other external sources, preferably belonging to a user profile.

In an embodiment, one or more (conventional) touchscreen(s) and/or screen(s), preferably with several pressure ranges, are used in combination with the input device. The separate inputs via the touchscreen and/or screen and the input device are preferably processed at the same time. In an embodiment the absolute position of the input device in the coordinate system of the input device is calculated to an object such as, for example, an HMD, tablet, laptop or clock. From this absolute position, the position of other parts of the body, such as, for example, the elbow or the shoulder, are calculated. In an embodiment the input device is set up in such a way that the input device is detectable, in addition to the aforementioned functions, by means of electromagnetic transmitters (for example iBeacon). This function can be used, for example, in a room or in an environment with electromagnetic transmitters (for example iBeacon) for locating the absolute room position of the input device. This is useful for any additional and/or special applications.

Such a recording unit is preferred that does not have any negative effect on the neighbouring (electronic) devices, such as, for example, would be the case with a magnetic field. More particularly a passive recording unit is preferred that uses the natural reflections of electromagnetic radiation, for example, light, wherein the reflection can be boosted by transmitting a corresponding radiation. Even in the latter case, most (electronic) devices are not disrupted by the transmission of a corresponding radiation because the radiation is in the naturally occurring range or only slightly exceeds this range and the (electronic) devices are designed to be secured against such radiation.

To prepare or process the recording data, a computer unit is provided in the input device that, for example, comprises a processor and a working memory and, as the case may be, for example a solid state memory.

In a particularly slim version of the input device, the content of the recording data is formatted unprocessed for sending with the transmitter, for example, in data packets for a Bluetooth® transmission or subdivided into a Zigbee transmission and encrypted for the transmission according to the transmission protocol. Processes are possible according to the Internet Protocol (IP) and, for example, sending by WLAN transmission, wherein, in this case, primarily the increase of transmission range is achieved. A transmission using mobile telephony standards, such as, for example, a UMTS standard or LTE can also be used. For a usage with an HMD, a range of up to 2 m [metres] is completely sufficient and therefore the less disruptive Bluetooth® standard is a preferred transmission standard. Infrared transmission (IrDA) is rather unsuitable, because to do this visual contact must be maintained and a movement of the hand is restricted by this. But also this transmission technique is not disadvantageous in every possible application. The transmitter or a further transmitter is preferably not only configured for an electromagnetic remote field, such as, for example, in case of Bluetooth®, but also for a near field such as, for example, in case of magnetic induction (Near-Field Magnetic Induction, NFMI). The IrDA and NFMI transmission is primarily suitable for an activation of the input device, for example, for an interaction command, by means of holding the input device to a receiving station.

In an embodiment, the input device, as well the transmitter also exhibits a receiver for electromagnetic signals. For this, the same antenna is preferably set up for the transmitter and receiver as what is known as a transceiver.

The input device preferably exhibits a unique identifier (ID). Any data can be encrypted with this ID, for example, name, address, credit card data. The data is stored in an input device, in the external computer unit and/or in another external source.

All components of the input device are already fundamentally known and have proven themselves as robust and suitable for everyday use, so that a user can
undertake their everyday activities undisturbed with the input device. Particularly advantageously, contact with water is even uncritical, so that the input device does not have to be taken off or only rarely, so that it is not damaged.

It is pointed out that the input device is particularly preferably set up for real time applications. This means the movement of at least one finger is converted with negligible delay, preferably in the millisecond range, into a virtual interaction. The processing of data is done through the internal computer unit or through a powerful and therefore more energy-consuming external computer unit that is attached to a more voluminous or fixed power source.

Many everyday tasks are solved by precise movements of the finger. In this respect, most previously known input devices are restricted and particularly do not allow a careful, therefore a fine and precise, manipulation. With the input device proposed here, first of all, a particularly precise interaction is possible, wherein no tiring movements have to be carried out in a prescribed input area.

The recorded position of the at least one finger preferably relates to the part or the parts of the finger which is used for a corresponding real interaction. For example, the position of the fingertip provided for the interaction is detected if, for example, a button is pressed or a bar is to be pushed to one side. In another example, the inner surface of the finger is detected, that would be used in a real grasping of a corresponding object. Recording of the position of the at least one finger in the context of this invention does not mean the apparent assignment of the place of attachment of the input device to a recorded finger, which is however also usable for many applications.

According to an embodiment, the user points with a finger, typically with the index finger, to a device in order to control this device. Consequently, the user can run commands for his specific device or several devices. In an embodiment, the finger or fingers appear on one or more screens.

According to an embodiment, the input device can be used in combination with real surfaces which give a (real) tactile and/or haptic feedback to the user for a corresponding interaction with a virtual surface.

According to an advantageous embodiment of the input device the fastening device is a ring, wherein the ring can be fastened so that it fits correctly onto a finger.

By the design of the (entire) input device as a ring, various advantages are achieved. Firstly, rings are socially compatible and comfortable to wear at any time, and therefore can be carried as a constant accompaniment. Furthermore, the ring has the technical effect that the ring is located in the coordinate system of the finger and therefore the approximate position of the finger is known without measurement and also the finger does not first have to be found, such as is the case with external recording units, because in the entire—as large as possible—field of view one or more hands or also no hands may be present. Due the restricted possibility of the relative position of the finger to the ring, the hand model and also the movement model is slimmer compared to previously known input devices and the data can be processed more quickly. Also, determining the position of the finger is less erroneous, because the fingers are arranged close to the recording unit and, due to the restricted possibilities of the relative position of the fingers to the recording unit, many confusing surfaces due to the position in the room can be excluded, for example, the hand of another person in the recording area of the recording unit. Furthermore, it is advantageous that in case of a position of the ring on a finger only few occlusions may occur and also the few possible occlusions are conditioned by (known) finger positions which generally using a hand model and/or movement model, allow a reliable conclusion as to the position of the concealed fingers.

The ring exhibits at least one energy storage, preferably a battery that is arranged in the ring, wherein particularly preferably at least one energy storage in the ring can be charged via a plug with conducting contacts. The energy transmission may also be done through electromagnetic waves through inductive or capacitive connection in the respective near field or far field. Alternatively or in addition, the energy storage comprises a (super) capacitor, and can be charged within seconds on a charging station, preferably without the ring having to be removed. This capacitor supplements the battery or is the sole energy storage in the ring. An energy storage of the ring is formed by a rechargeable battery, electrical storage (for example by means of a capacitor or super-capacitor), chemical storage (for example by means of a battery) and/or mechanical storage (for example by means of a spring or by means of a flywheel). To charge the at least one energy storage, in an embodiment solar cells are provided, which are preferably adapted to the ring shape. Alternatively or as a supplement, a rotor is provided which uses the mass inertia or temperature difference to generate electrical energy, in a similar way to an automatic watch. In an embodiment the ring can be fitted with such a rotor in a charging station to be mechanically rotated. In an embodiment with a solar cell, the at least one energy storage of the ring can be illuminated by means of a visible laser beam, preferably in a charging station with a preferably small solar cell. Alternatively or as a supplement, at least one solar cell of the ring can be charged by the ambient light and/or by means of specially directed light sources, such as in a charging station, for example. As, for example, in quartz watches or hearing aids, in one embodiment at least one energy storage can be replaced. The replacement is preferably so simple that the end user, as in case of many watches, can replace the battery without professional assistance and/or professional and/or expensive aids, for example, by means of a screw closure or a click closure. The at least one energy storage is preferably integrated as at least one decorative element in the ring. In an embodiment, the ring is composed of a plurality of separate partial rings, which with a different radius can be arranged in one another and connected to one another and/or composed of respectively thinner partial rings that can butt against each other and are connectable in the direction of the ring axis, and can also be recombined. In one of the separate partial rings, preferably the at least one energy storage is placed and therefore the at least one energy storage can be replaced when replacing the relevant partial ring.

Preferably, the spatial expansion of the ring is set up such that the neighbouring finger remains free to move independently of the ringed finger relative to the ringed finger. The ring is therefore preferably set up at a maximum standard size, for example with an internal ring diameter of 23 mm [millimetres] or with an internal circumference of 69 mm and an adjustment device on the inside can be or is envisaged so that, for example, a minimum ring internal diameter of 14 mm [millimetres] or a minimum ring circumference of 42 mm can be set. For example, a corresponding insert for the desired ring size, for example 54 mm, can be inserted into the ring, so that the ring can be fastened to the finger so that it is safe from being lost. A conical thread, such as a collet may also be provided which allows individual adaptation. However, various standard sizes may also be offered.

In a particularly preferable embodiment, it is not required to put the ring into an exact position; as the recording of components of the at least one finger are sufficient for the arrangement in a hand model. For example, the ring can be arranged at any position along the axis of the finger on the proximal phalanx behind the interphalangeal element. Particularly preferable also a tipping of the ring on the finger by up to 30° is not damaging to the correct operation of the recording unit.

Nevertheless, it is particularly advantageous if the ring exhibits a rotational angle assignment around the finger axis that can be controlled by a corresponding mark. For example, the ring exhibits a notch and/or a coloured dot which allows the user to check the position rapidly. Alternatively, due to an accelerometer, the position in the gravity field in comparison to the hand alignment can be checked, so that the user gets a warning if the ring is in the wrong position. However, also items of jewellery may be provided that allow the position to be checked visually. Generally, a ring may be connected sufficiently secured to the finger so that it does not twist only through properly fitting diameters so that only a single check of the position is necessary when it is put on and the ring then remains in the desired position during normal everyday stress of the hand. However, a geometric system, thus a type of flange, may be formed which when in contact with a further component of the hand or using the out-of-roundness of the ringed finger prevents the ring from rotating.

If a twisting of the ring in an angle range of up to 60° is prevented or at least is easily controllable by the user, it is possible to make a restriction in the recording unit. Then, for example, a recording area, designated in the following as a field of view regardless of the technology, can be restricted to the inside of the hand and/or to the back of the hand. If the ring also exhibits a separate recording unit, for example for the thumb, which thus needs a right-left alignment, this can also be checked by an indication as described above.

The recorded position of the finger is the position of a finger other than the position of the ringed finger. The ring is preferably set up, furthermore in addition to recording the position of at least one other non-ringed finger, also to detect the position of the ringed finger, wherein, to do this the recording unit does not necessarily have to be used. Preferably, a distance sensor is provided for this special task. The ring is preferably at least configured to record the position of the index finger and particularly preferably, in addition, the position of the thumb while the ring is fastened to the middle finger or to the ring finger.

In an embodiment or in an special operating mode, the input device is set up only to evaluate the direction of the index finger and therefore to allow simple interactions such as, for example, in presentations or when operating a television. The input device is preferably able to be used as a replacement for a 3D computer mouse for computer-aided design (CAD) applications.

According to an advantageous embodiment of the input device the recording unit is at least one camera with a preset field of view, wherein by means of the field of view at least one finger of the hand can be detected and wherein the at least one camera is set up to record images of natural surfaces, preferably by means of a wide angle objective.

The recording unit is preferably at least one camera for visual recording of components of at least one finger. Another embodiment uses an ultrasound sensor, a laser emitter with laser recorder or a measuring device for bioelectric fields or for the disruption of a generated field. The use of a camera with visual field of view allows a particularly simple and in the meantime very cost-effective implementation. Because the input device is arranged directly on the hand, in everyday use it only gets extremely rarely into blocking the field of view, particularly with the design as a ring on a finger. The occurrence of disruption to the field of view condition is a common disadvantage of the previously known comparable devices. There is extensive research for this to determine precise statements about concealed hand components, such as, for example the HOPE (Hand-Object Pose Estimation) software, which are however extensive and/or erroneous. With the input device proposed here, such software is superfluous.

It is pointed out that the camera records the natural surfaces of the hand, without the hand having to be provided with special reflection position markers or a covering, for example, in the form of a glove. Because the possible recording data is restricted to a (slim) hand model as well—thus in the computer unit or in an external computer unit, the recording data only has to be compared with the stored hand model, the recording data does not have to be of good quality with respect to the resolution, sharpness and contrast. Therefore at least one small and cost-effective camera can be used. More particularly preferably, the camera is equipped with a wide angle objective and arranged on the side of the palm and/or opposite on the side of the back of the hand and exhibits a field of view between preferably ±100°, particularly preferably between ±80°.

In a preferred embodiment only one camera is provided for a field of view which records only two-dimensional images. The shadowing and size ratios of the two-dimensional data allows a 3D dataset to be determined using a hand model. This 3D dataset in turn allows a calculation of the components of the hand, particularly preferably the finger tips that are not arranged in the field of view of the camera using the hand model and/or a movement model. This data determination is made particularly easy in that the at least one camera is directed with its field of view directly onto the components of the hand. Particularly in the design as a ring, the field is view is set up to record components of the hand in such a way that the possibility of a relative position to the ring is extremely limited and the determination of data can therefore be made particularly robustly and securely; because the recordings in preset areas of the field of view may only be components of the hand. In order to achieve a smaller construction height of the ring, the focal length and objective height must be minimal. Therefore, the objective is realised with only one single lens. In an embodiment, the lens used is formed by means of a conventional lens. Alternatively, the lens is formed by means of one or more aspherical lenses, by means of micro-lens arrays, Fresnel lenses and/or gradient lenses. These are made of suitable glass or plastic and preferably have a scratch-resistant surface.

In a method such as precision injection moulding for plastic or precision blank pressing for glass, the optical lens, the mechanical securing of the focal length and/or the distribution of light of the infrared light emitter, preferably including the formation of the light cone, is preferably functionally integrated into the mould as a single part. The holder of the lens and/or the aperture is preferably integrated in the housing of the ring so that no further components are needed for fastening the lens(es). To make integration easier, the lens and the bracket can be manufactured in a 2-component injection moulding process. Preferably, comparable technologies for the optics and lighting are used as in cameras, 3D cameras, gesture sensors and lighting in smartphones.

According to a further aspect, the camera is also able to be used to scan markings and/or barcodes or QR codes.

According to an advantageous embodiment of the input device, the input device comprises an infrared light emitter and the at least one camera is set up to record infrared light, wherein by means of the infrared light emitter according to a preset pulsing, infrared light can be emitted in the field of view of the at least one camera.

In this preferred embodiment, the property of the skin to reflect light frequencies beyond the visual range for humans is used, so that the human eye is not disrupted by the emission of infrared light. Due to short-term light emissions, for example as flashes of light in the millisecond range, the detection is synchronised through a corresponding infrared camera. In so doing, the detection is diverted from the rather static relatively little dynamic background in most applications and only the changes of the more dynamic finger movement or hand movement are detected. For example, this can be adjusted by an integrative detection of the movement, thus detection of the change of movement. Thus, the necessary performance of the recording device can be reduced to the desired data and the amount of data can be kept slim. As a result, rapid data processing with low usage of resources is possible.

According to an advantageous embodiment of the input device, the input device furthermore comprises at least one input unit, wherein by means of the input unit, through operation of coming into contact, at least one command can be entered in the computer unit of the input device.

The input unit proposed here already allows the user to input simple commands, such as, for example, on/off, change mode or similar. The input unit is, for example, a (push) button, a touchpad or an accelerometer, wherein the latter implements a command, for example, by shaking the input device. According to an advantageous embodiment of the input device, the input unit is formed integrally by the recording unit, wherein by approaching or coming into contact with the recording unit or the (wide angle) objective, a command is triggered by the user, preferably with the thumb, in the computer unit of the input device. With the input unit, for example, energy can be saved if the input device does not have to be used. For example, the input device may at least sometimes deactivate itself (change to standby mode) if, for a period of time that can be preset, no movement is recorded. This can also be visually shown to the user by a change of the representation of the pointer on at least one screen. If a movement is registered again, the input device is reactivated (fully). The input device is, for example, able to be shut down by means of the input unit. Alternatively or in addition, the input device shuts itself down after a preset time limit is exceeded if the user is no longer using the input device. Alternatively, or in addition, by means of a signal from an external computer unit, the input device can be shut down. Alternatively, or in addition, the input device can be shut down immediately by means of special gestures, such as, for example, touching the fingertips of the thumb and the ring finger.

For a simple embodiment of the input device as a ring both for left-handers and for right-handers, an input unit, preferably a (push) button is arranged on each side, so that it can be operated by means of slightly bringing the thumb of the wearing hand into contact with it respectively. For example a tap (able to be registered as a virtual interaction as an object) can be controlled with the input device by the user pressing/contacting the input unit and keeping it pressed/in contact and then sweeping along the tap to change the quantity of water.

According to an advantageous embodiment of the input device, the input device furthermore comprises at least one accelerometer and/or a gyroscope, by means of which spatial changes of position of the input device can be recorded.

Using this additional sensor technology it is possible to use the change of the spatial position of the input device itself as further (additional) input data. For example, For example, the user can not only input a scrolling through the finger movement of the otherwise resting, or at least non-registered movement of the hand, but also or alternatively, by means of moving the entire hand. As a result, the natural operability of the virtual surface displayed to the user and controllable by the input device is completed. The user does not have to think about the manner of input, but the operation follows instinctive and familiar movements that are known from the interaction with the natural (real) environment. According to an advantageous embodiment, the data determined by the input device are combined. For example, the measurements of the accelerometers and/or the gyroscopes are used to stabilise the camera images. Several accelerometers and/or gyroscopes may be placed in the input device at various locations. As a result, the movement of the input device can be detected more precisely in space. A magnetometer can be used for absolute orientation. According to an embodiment, if the input device is switched off, at least one accelerometer or at least one gyroscope monitors the movement of the hand or finger wearing the input device in short intervals. As soon as, for example, the finger taps onto the surface once or many times, the input device switches itself on. For example, this functionally replaces the input unit which is then not needed.

According to an advantageous embodiment, other measurement devices are provided in the input device, such as, for example, electromagnetic distance sensors, measurement and evaluation of the signal strength of the transmitter and/or receiver and the evaluation of image data in the same way as an optical mouse. These additional data can be combined with the existing image data, acceleration data and/or gyroscopic data. To merge the measurement data, among other things, derivations of the Kalman filter, such as, for example, the unscented Kalman filter are suitable.

The input device, or the computer-executable method for operating the input device is preferably therefore set up, with the help of image data, acceleration data, gyroscopic data, other sensor information and/or information from the connected external computer unit, including data from external sources such as the internet, by means of the corresponding components of the input device, to recognise the wearer of the input device. The input device is furthermore set up so that the behaviour of the relevant wearer is to be stored in a user profile in the input device or in the associated external computer unit and called up again as required. The recognition of the wearer is used, according to a preferred embodiment, as authentication, in the same way as with a fingerprint scanner. The authentication can, for example, be used to authorise payment processes and/or to open doors.

In the input device, in an embodiment, other sensors such as pulse counters or thermometers are integrated. With the data from the accelerometers and/or the gyroscopes, for example, the behaviour of the user can be evaluated, for example, by counting the steps taken on foot.

In an embodiment, other sensors are arranged on the side of the ring on the radial-ulnar axis of the hands, which are set up to measure the distance or to record a movement of the adjacent finger elements. To do this, no additional element is attached to the adjacent fingers.

However, it should be pointed out that without such sensors, merely through detecting the at least one finger by means of the recording unit, on the basis of a movement model of the hand, a natural operability is achieved that cannot in any way be achieved by using exclusively accelerometers or other previously known sensor technology for similar purposes. The variety of movement recording is also not achieved by the use of several input devices, for example, which are arranged respectively on one finger. The complexity of the detectable movements of the hand therefore increases considerably with the proposed input device, although only one individual ring is needed for each hand.

In an advantageous implementation of the input device, a gradation of commands, whether via the recording unit or via the motion sensors, is possible. For example, when there is a manipulation movement of one or more finger a virtual sensor is slowly scrolled, while when swiping with the entire hand, that is recorded with a motion sensor, a faster scrolling or browsing is triggered.

It is therefore pointed out that it is not ruled out that with the input device even less intuitive or even intentionally difficult to learn movements can be converted into an interaction if this, for example, is considered to be useful to keep the interaction confidential.

According to an advantageous embodiment of the input device, the input device comprises at least one marking, by means of which the position of the input device can be determined by means of an external detection device.

An input device with this marking can be detected, preferably visually by means of a further camera on an HMD. For example, an IR marker, that is set up for the predefined reflection of infrared light or a visual characteristic which is known to a camera that forms the external detection device, is provided on the input device, so that a computer unit detects, for example, the position in space of the input device relative to the external detection device by means of the external detection device. Also advantageously, an NFC (Near Field Communication) signature is used, the position of which can be held by guiding the input device in a corresponding NFC sensor field, for example, for activation on an HMD. Particularly preferably, the recording of the position of the input device is only needed once for a usage or only with large time intervals (for example every few minutes), because the position can be calculated by other sensor technology that determines the relative changes of position, said sensor technology being arranged in the input device. Only to rectify errors is the position then corrected. For many applications, a single detection of the position in space is also sufficient because the human hand-eye coordination makes a corresponding adjustment in connection with the virtual representation and the user accepts slight deviations at least for the actual application.

According to an embodiment, on a (real) surface, markings are provided that delimit special areas of the interaction. For example, one or more markings set the position of a virtual keyboard. The input device detects optical marking using camera images, electromagnetic transmitters and/or reflectors, for example, by means of antennae.

According to a further aspect of the invention, a system for representation and for interaction with a virtual surface is proposed, which comprises at least one of the following components:

At least one input device according to the description above,

At least one screen to represent a virtual surface for the visual detection;

At least one central computer unit to process recording data into a corresponding virtual interaction, wherein by means of the interaction at least one virtual surface can be manipulated.

The system proposed here shows an advantageous incorporation of the input device into an application for a human user. The user obtains a representation of at least one virtual surface via at least one screen. Here, the at least one screen is any known or still to be developed device that is set up to represent editable (2D/3D) images that can be detected by the user. A virtual surface is an image that is perceived by the user as an object. In so doing, it is circumstantial how natural or how real the representation of the object appears to him. However, the surface is characterised in that it is incorporated into a processing system which enables a manipulation on the surface. For example, the surface may be that of a real object, which can be manipulated using controllable tools, for example, based on robotics. Also, the surface may be generated completely artificially and be manipulated accordingly by programming by means of specified virtual interactions. To do this, in the following, several illustrative examples will be given.

In this system, the virtual surface now enables the manipulation of the at least one virtual surface particularly intuitively by means of the input device described above, because it is not absolutely necessary to learn gestures for controlling.

The computer unit needed may be arranged both in the input device and at another location in the system, for example, an HMD or a smartphone or a processing unit that is connected via the internet. In so doing, the computer unit may have a hand model and movement model stored, or obtain these data from the input device or another external source. This is particularly to be set up with regard to the necessary processor size, storage size and/or data strategy of the provider.

According to an advantageous embodiment of the system, the at least one screen is a head-mounted display and the at least one virtual surface is incorporated into the visual perception of a real environment.

In this particularly preferable embodiment of the system, the at least one screen is provided in a head-mounted display (HMD) and the representation of the virtual surface is mixed with the real environment of the user in what is known as AR [Augmented Reality]. By means of the input device proposed here, the hands always remain free for actions in the real environment. For example, a craftsman is shown guidance through the HMD when undertaking a repair and the input device can be used to browse or zoom or move the display, while the input device does not hinder the craft activity. With an HMD it is preferable that a single screen is provided for each eye, wherein by a corresponding different spatial arrangement of one and the same motif a spatial perception (3D) can be generated for the user.

According to a preferred embodiment of the system a plurality of virtual interactions can be simultaneously conducted by means of a plurality of fingers.

The mobile systems known to date are restricted to a few input operators, for example, an individual cursor or at least to a restricted field in a visual connection to a remote camera, wherein, in turn the extremely movable hand conceals itself in many of the movement positions. A corresponding concealed hand position cannot, in the prior art, be compensated for or can mostly only be determined imprecisely with an extensive hand model. The input device now allows an interaction that is otherwise concealed from view of the at least one hand with the system, for example, with the hand in the pocket or when repairing in a difficult to access space, in which an HMD produces a virtual "X-ray view", thus the (virtual) field of view, in which the hands are located, which is restricted for recording by a camera arranged on an HMD.

According to an advantageous embodiment of the system, at least one input device is provided on each hand and the relative position of the input devices to each other can be referenced.

In this advantageous embodiment, a manipulation of a virtual object with both hands is enabled. In particular, through a preferred single referencing of the relative position of the hands to each other, the operation of a virtual representation is made particularly easier. However, a referencing of the hands to each other must not occur for each application. For many applications, for example, the operation of a virtual keyboard, this is not required, if the letters, for example, are fixed to the hand; therefore, with a German keyboard layout (QWERTZ) for example, the block of letters QWERT are assigned to the left hand and the block of letters ZUIOPU is assigned to the right hand. With referenced hands, however, for example, a virtual block can be grasped and moved by both hands, if the hands are arranged in the correct relative position to the virtual object and, for example, they are within a distance limit according to the description above.

According to a further aspect of the invention a method for manipulation of a virtual surface by means of a system for representing and for interaction with a virtual surface is proposed, preferably according to the description above, wherein the system exhibits at least one of the following components:

At least one screen to represent a virtual surface for the visual perception;

At least one central computer unit to process recording data into a corresponding virtual interaction, wherein by means of the interaction at least one virtual surface can be manipulated; and At least one input device for a virtual application by means of a computer unit, preferably according to the description above, wherein the input device comprises at least the following components:

A fastening device for fastening to a hand;

A recording unit for creating recording data of the relative position of at least one finger of a hand with respect to the input device and/or with respect to at least one further component of the hand and/or with respect to a real surface, if the activated input device is fastened to the hand by means of the fastening device;

An internal computer unit for processing the recording data;

A transmitter unit for sending the processed recording data of the computer unit, wherein by means of said recording data at least one corresponding virtual interaction can be generated by means of the internal and/or an external computer unit, wherein the method comprises at least the following steps:

Recording at least one part of a finger by means of the input device fastened to a hand;

Detection of the at least one part of the finger by means of the stored hand model;

Detection of the relative position of at least one part of the finger with respect to the input device and/or with respect to at least one part of a detected component of the hand;

Comparison of the detected relative position with the movement model of the stored hand model;

Calculating the relative position of the at least one finger;

Calculating a virtual interaction on the basis of the relative position of the at least one finger and/or a change of the relative position of the at least one finger.

With the method proposed here, which can be, as a computer program or stored on a computer program product, executed on a modular computer with at least one processor, as the case may be at least one memory unit, at least one working memory and at least one user interface in conjunction with an input device according to the description above, a particularly simple interaction with a virtual object is possible.

To conduct the method, the input device is fastened to the hand, preferably to a finger, more particularly preferably one of the fingers: ring finger, middle finger or index finger. An exact measurement of the position on the hand is not necessary. The fastening is also to be designed solely secure against losing, so that the user does not have to worry about the input device.

For the detection of the components of the hand according to the method, at least for parts of the at least one finger, an exact positioning is not necessary. In this position, the recording unit is configured to record at least parts of the at least one finger and to compare the recording data with a hand model. In so doing, the finger and its position are detected. The underlying movement model therefore allows a statement about the changes of movement of the detected finger and also, as the case may be, of the other components of the hand, for example in case of a completely extending the detected finger and a translatory movement of the fingertip, a twisting of the palm around the finger root joint and the hand root joint must simultaneously occur. From this, a relative spatial change of position of the fingertip may be calculated, even if the fingertip itself is not in the detection range of the recording unit of the input device. For example, the path covered from the initial position of the detected finger can be calculated, which corresponds to a necessary path for pushing a virtual button and therefore the button can be operated with this movement.

Because the input device is arranged on the hand so that a part of at the at least one finger can be detected that suffices to calculate the virtual interaction, the input device, apart from an externally run calculation of the finger position, as the case may be, can record all the necessary information completely autonomously and forward it to an implemented user interface. For example, only one radio connection is needed to the user interface of the system.

According to an advantageous embodiment of the method, a position limit concerning the position of a finger relative to the input device, to a real surface and/or to another input device is predefined and a finger is activated for virtual interaction, if it is within the position limit, and a finger is deactivated if the position limit is exceeded.

With this advantageous embodiment, the position of a finger in relation to the input device and/or to a real surface and/or to a further input device, for example, a computer mouse or a keyboard, can be used to activate the finger in the virtual environment. If, for example, the finger is guided upwards, therefore in the direction of extension to the back of the hand, then the finger exceeds a preset position limit and is deactivated. On the other hand, if a finger dips down, therefore in a bending direction to the palm below the position limit, the finger is activated and can then be used in the virtual environment to input control value. Particularly preferably, the position limit is located at the boundary of a field of view of a camera in a ring, the camera of which is arranged on the side of the palm. Particularly preferably, the position limit is located at a predefined, perpendicular, preferably plumb-vertical, distance to a, preferably real, surface or to a further input device, for example, of at least 2 mm [millimetres], particularly preferably at least 5 mm [millimetres]. Particularly preferably, the real surface is a screen, preferable a flat screen or a shaped (any), for example, a curved screen.

In a particularly advantageous embodiment, a finger must undertake an activation movement, for example, tapping, to be activated and vice versa, a deactivation movement to be deactivated. This avoids the user having to maintain an uncomfortable finger position to keep a finger deactivated.

It should be pointed out here that the field of view of the recording unit does not have to be in connection with the representation on a screen. Rather, a finger may be activated while it is not represented on the screen, because, for example, it is located outside the representation or is concealed by the representation. This also applies accordingly vice versa for a finger that would be located in the area or representation of the screen, but which has been deactivated.

According to an advantageous embodiment of the method, in case of a plurality of detected fingers, a virtual object can be contacted and/or manipulated.

By means of the detected fingers, in this preferred embodiment, a virtual object can be virtually touched, which means that the user obtains a response via an interaction with a virtual object when he moves with his fingers to the surface of the virtual object. For example, the object can be moved and/or deformed by a virtual touch which would cause intersection of the fingers with the object. Forexample, an object may move if it, for example, is grasped by being within a distance limit according to the description above. According to an advantageous embodiment of the method, via a second input device on the second hand, the method according to the description above is conducted for the second hand and with respectively at least one finger a common virtual interaction is performed.

In case of this embodiment of the method, virtual interactions may be conducted through two or more fingers of the two hands. In so doing, preferably the at least two fingers are spatially referenced to each other, to be able to act due to the relative position to each other as in the real environment. For many applications, such as, for example, with a virtual keyboard, the actual relative position of the fingers to each other is not absolutely relevant. For example, then when driving a car, with occupied palms (steering wheel and any gear level) at the same time, it is possible to type on a keyboard in the ten finger system.

According to an advantageous embodiment of the method for representation of a virtual interaction on at least one screen by means of a computer unit described in the beginning, the at least one pointer is created by an input device according to the description above.

The input device described above is particularly suitable for creating a plurality of pointers and is also not locally bound to an external camera system or a visual connection to an external camera system, for example, to an HMD. Therefore a comfortable, autonomous and intuitive operation of a virtual surface is possible. The representation of the finger as defined deformations allows a good feedback to the user and an intuitive, virtual interaction in the virtual environment, which is only transmitted visually to the user.

The ring allows, in combination with the method described here, a customised deformation representation. If, for example, an input device in the form of a ring according to the description above is used, the internal ring diameter could determine the size of the deformation. Alternatively, the detected recording could allow a size comparison. This is advantageous, because the user is used to the size of his finger and can therefore act particularly intuitively in the virtual environment.

According to an advantageous embodiment of the method described in the beginning for representation of a virtual interaction on at least one screen by means of a computer unit, the method is incorporated into a system according to the description above.

By means of the incorporation of a method for representation of the pointer and the virtual interactions by means of the user's own finger as defined deformations, particular in connection with an HMD, an independent and simple operation is possible. Therefore, first of all, a solution for the operability of the applications represented by an HMD that has actually been marketable in the meantime has been found. No local connection, no unnatural movement and not learning gestures is required from the user. In addition, the method can be implemented by means of the input device comfortably and in a manner suitable for everyday use.

According to an advantageous embodiment of the method described here, each of the methods is executed as a computer program and/or is stored on a computer program product and can be executed on a computer unit, preferably a module PC or Mac, on a tailored consumer product such as a smartphone or HMD after copying of the computer program or according to a method ready-for-use after installation. The methods stored as a computer program and/or on a computer program product may therefore be designed to be modular and can obtain necessary known and already worked out method components for conducting the method from other sources, such as, for example, a server in the internet. Furthermore, additional hardware, such as, for example, cameras and motion sensors, preferably in a smartphone and/or an HMD, can be incorporated to execute the method.

The invention described above will be described in the following in detail on the basis of the relevant technical background, with reference to the associated drawings, that show preferred embodiments. The invention is not restricted by the purely schematic drawings in any way, wherein it is to be noted that drawings are not to scale and are not suitable for defining size ratios. It is shown in FIG. 1: a diagram of the defined deformation, FIG. 2: a diagram of the defined deformation with ridge, FIG. 3: a diagram of an input device as a ring, FIG. 4: a system with an HMD and an input device as a ring, FIG. 5: a hand with an input device in the form of a ring, FIG. 6: a sequential diagram with a preferred detection process, FIG. 7: a sequential diagram of a preferred activation process, and FIG. 8: a virtual object with five deformations of the finger of a right hand.

In FIG. 1 a virtual surface 3 is illustrated in principle by a frame structure. For many applications, the frame structure is only shown on a processing application for a programmer and the user is shown shadowing and/or deformations of structural elements, such as, for example, letters on the virtual surface 3. On the virtual surface 3, a Cartesian coordinate system is defined (but generally not represented to the user), wherein the origin of the z-axis 31 is situated in the plane of the undeformed virtual surface 3. The x-axis 29 and the y-axis 30 span this plane.

In this case, the pointer, which can be created by an input device of any type, is represented by a defined deformation 4 of the virtual surface 3. Here, the deformation 4 emerges along the z-axis 31 in a positive direction from the virtual surface 3. The deformation 4 is defined so that the remaining virtual surface 3 remains unaffected by the deformation 4.

Figure 2:
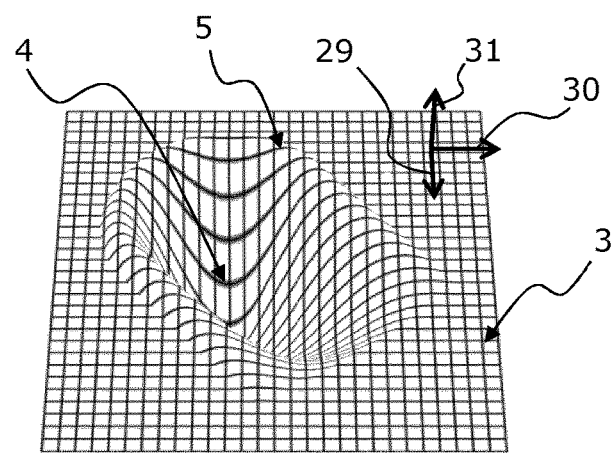

In FIG. 2 a similar deformation 4 is shown in a virtual surface, which is represented as a frame structure for better understanding. In this case, a Cartesian coordinate system is again defined with the origin of the z-axis 31 defined in the plane of the undeformed virtual surface 3. In this case, the deformation 4 is primarily formed as a depression in the negative direction to the z-axis 31, wherein as with an incompressible elastic material, the penetrated virtual material throws up a bank 5 or ridge, in the positive direction to the z-axis 31. This gives the user feedback on the desired characteristics of the virtual surface 3 and also makes it easier to find the deformation 4.

Figure 3:
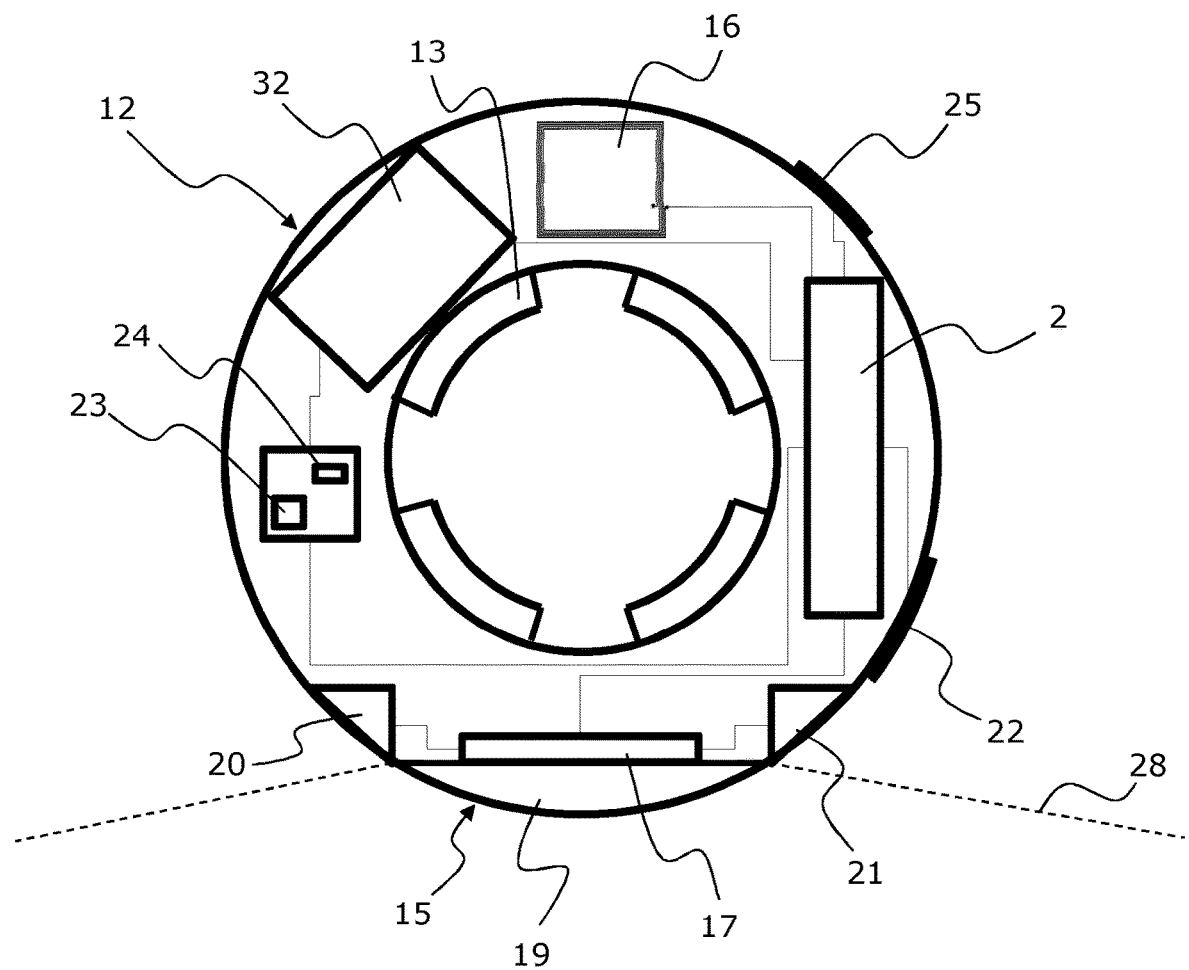
Figure 4:
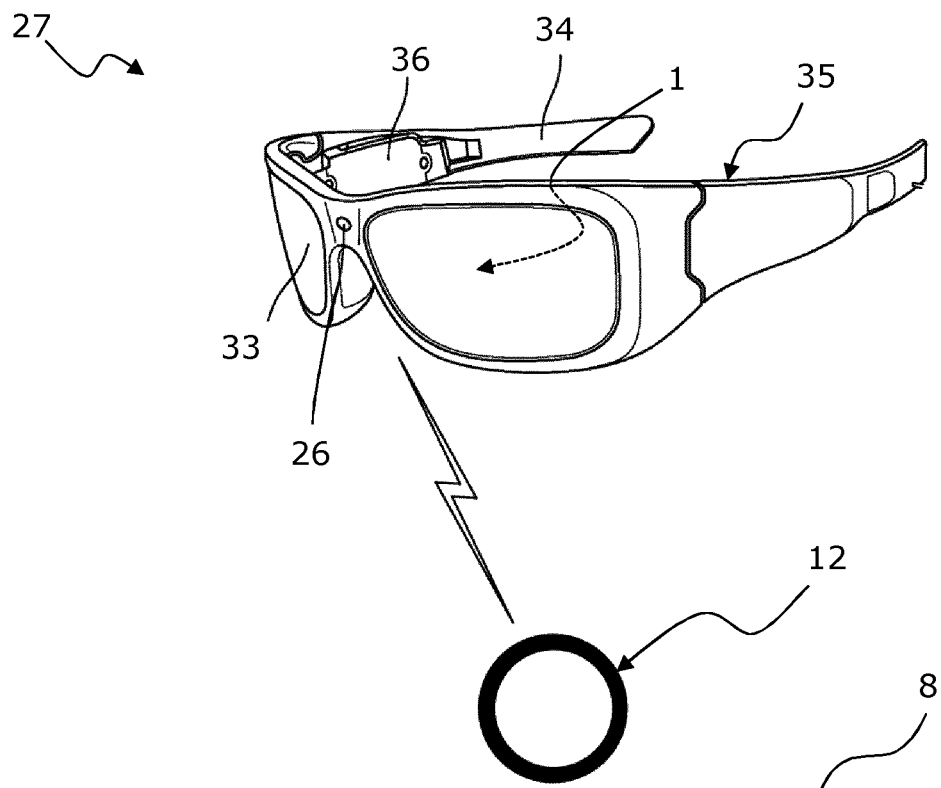
Figure 5:
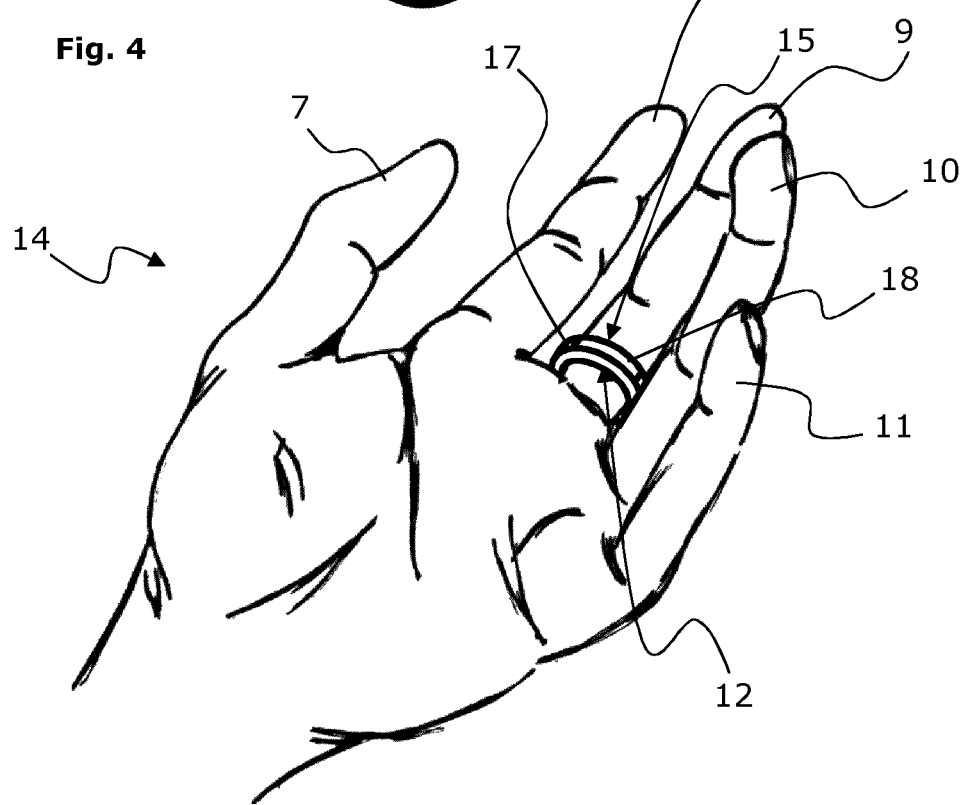

In FIG. 3, an input device 12 is shown schematically as a ring, which by means of one, here adjustable, fastening device 13 can be fastened on a finger with an accurate fit (see, for example, FIG. 5). In the input device 12, an internal computer unit 2 is provided which runs the control system and processing or preparation of the determined data. For this purpose, the computer unit 2 comprises at least one processor, wherein also the other components may comprise their own processors. The energy is supplied by a battery 32 that is preferably chargeable inductively, by which a plug connection can be dispensed with. To transfer the prepared or processed data on at least one screen or one external computer unit (for example, see FIG. 4), an antenna (transmitter unit 16) is provided that, for example, works in the free frequency range of 2.4 GHz [gigahertz] and, for example, supports the Bluetooth® standard. In the area represented below of the input device 12, which is preferably oriented on a finger in the fixed state towards the palm (for example, see FIG. 5), a recording unit 15 is located, consisting of a camera 17, or a photosensor, and a wide angle objective 19, so that a field of view 28 arises that exhibits an angle about the finger axis of almost 180°. Therefore, the fingers can be detected at least in an activated state, almost all the time at least partially. Using a hand model and a movement model, for example, the position of the fingertips can be calculated. In this preferred example, furthermore a first infrared light emitter 20 and a second infrared light emitter 21 are arranged in the ring in such a way that the finger situated to the side can be illuminated. Preferably, the light is pulsed, for example, with twice, preferably at least four times the frequency of the image representation rate. Therefore, the reflecting fingers can be recorded in optimal lighting, and preferably by means of an integrated change measurement. The correct position of the input device 12 can be ensured for the user or an external detection device 26 (see FIG. 4) by means of a marking 25, that is, for example, an infrared reflector and/or can be detected as a protrusion by the user.

Furthermore, this input device 12 exhibits an input unit 22 that, for example, is a button that can be pressed, in this case, which is worn, as in FIG. 5, for example, so it can be operated by the thumb.

According to an additional aspect, the input device exhibits an accelerometer 23, preferably for all three translatory spatial directions, and/or a gyroscope 24, preferably for all three spatial axes of rotation, through which the operability is even more intuitive. Particularly preferably, the gyroscope 24 can particularly be turned on and off, because in the normal configuration, the sensor masses of the gyroscope 24 must be kept in movement for measuring and the gyroscope 24 therefore exhibits a relatively high energy requirement in the measuring state.

FIG. 4 shows a system 27 in which one, or preferably two, screen(s) 1 are arranged on the inside of at least one of the, preferably transparent, spectacle lenses 33 of an HMD 35, so that, by means of the HMD 35 worn by means of the arms of the spectacles 34, an AR application is possible in an everyday situation. The input device 12, that is illustrated again as a ring here, is in an active state in radio communication with an external computer unit 36 that in this case is arranged at least partially on the HMD 35, and therefore transmits processed or prepared data on the position of at least one finger.

FIG. 5 represents a human hand 14 comprising a first finger 7, the thumb, a second finger 8, the index finger, a third finger 9, the middle finger, a fourth finger 10, the ring finger and a fifth finger 11, the little finger, wherein an input device 12 again in the form of a ring that can be fastened with an accurate fit is fastened to the middle finger 9, as a jewellery ring is worn. At the same time the input device 12 can also be fastened loosely, so that, just as a jewellery ring, it can be fastened so that it cannot be lost but can nevertheless slide. An exactly aligned position of the input device 12 along the finger axis, and preferably at an angle of rotation about the finger axis, is not necessary for detecting at least one of fingers 7 to 11. The input device 12 in this example comprises a recording unit 15 towards the palm that is composed of a first camera 17 for the thumb 7 and a second camera 18 for the remaining fingers 8 to 11.

Figure 6:
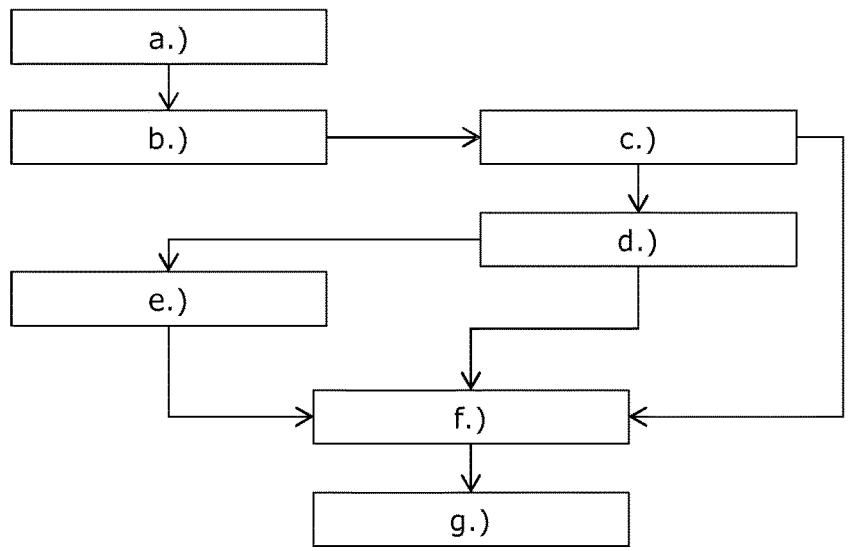

FIG. 6 represents schematically a sequential diagram to generate a deformation 4 (see FIG. 1 or 2) as a result of a detection of at least one finger. In steps a.) to g.) a method is executed which is extendible with steps beforehand and afterwards, as well as intermediate steps: In step a.) An image is detected;

b.) At least one partial surface of at least one finger is identified as such and isolated;

c.) The at least one determined partial surface is compared with a hand model and assigned to a finger;

d.) The position of the finger is classified and conclusions are drawn as to the position of other fingers and/or the palm, and particularly preferably the position of the finger tips, so that from the at least one detected partial surface using the hand model and the movement model, a clearly improved and more comprehensive set of information is created;

e.) This set of information is converted into a set of position information of the at least one pointer;

f.) On the basis of the hand model and possibly on the basis of the movement model, the shape and relative position of the respective deformation is calculated, wherein, as the case may be, the assigned material properties are considered;

g.) The representation of the at least one deformation is calculated on at least one screen in a virtual surface.

This process is repeatedly conducted with sufficient clocking, for example, at 60 Hz or is supplemented by a corresponding interpolation at the lower clocking speed.

Figure 7:
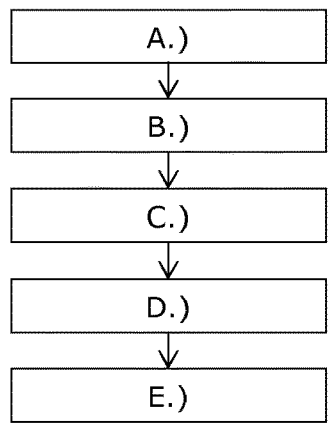

FIG. 7 represents schematically a sequence diagram for activation and deactivation of functions of the input device 12 (for example, see FIG. 3). In steps A.) to E.) a method is executed which is extendible with steps beforehand and afterwards, as well as intermediate steps: In step A.) the input device 12 is started by an input unit 22 and at least the fingertip of the index finger 8 (see FIG. 5), for example according to the method in FIG. 6, is detected and displayed centrally in at least one screen or centrally on at least one virtual surface or, for example, at the right hand on the H of a German QWERTZ keyboard, preferably by means of a deformation;

B.) by flapping at least one further finger to the palm, the at least one further finger is activated, and displayed on the at least one screen in a corresponding relative position to the index finger, also preferably by means of deformation;

C.) a virtual object can be grasped, pressed, pulled, pushed or manipulated in any other way by means of the activated finger. Preferably, for manipulation, undercutting a distance limit is necessary. When the distance limit is exceeded, the interaction is restricted to the representation of the position of the active fingers;

D.) it is now desirable to deactivate the other fingers, which is triggered by extending preferably all of the fingers. The representation of the remaining fingers, with the exception of the index finger, now disappears and no interaction is possible any more with the remaining fingers;

E.) The input device 12 is completely deactivated by operating the input unit 22 and the representation of the index finger disappears as well. Therefore, the interaction with a virtual surface by means of the input device 12 is completed.

Figure 8:
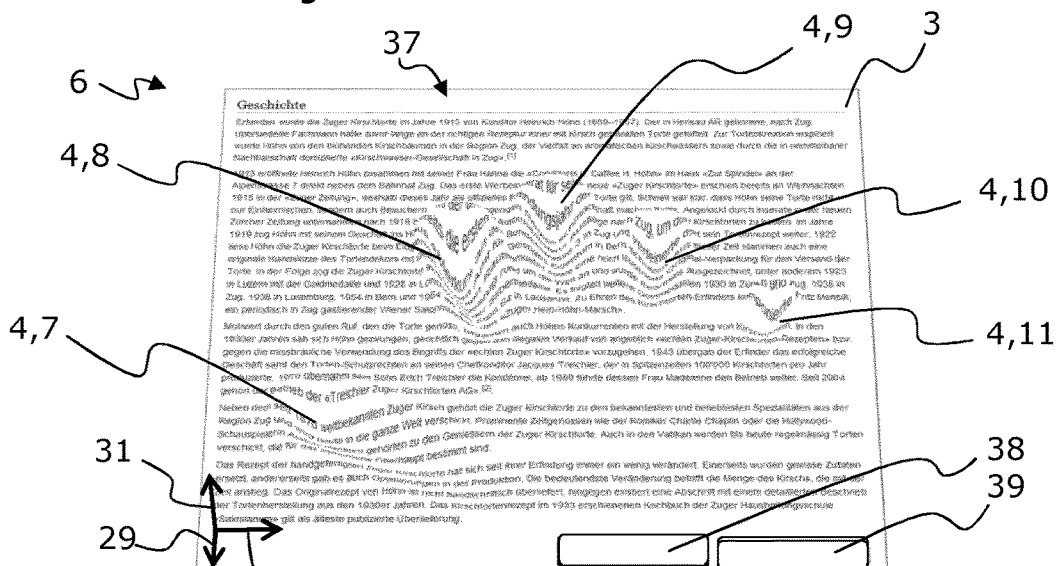

FIG. 8 shows a virtual object 6 which comprises a text on a first virtual surface 3 for the user to read and two control elements, here a first button 38 and a second button 39 of a GUI 37. In this case, the buttons 38 and 39 respectively form a second and third virtual surface that can be formed independently of the first virtual surface 3, for example, (respectively) exhibiting a deviating material characteristic. In this case, too, for better understanding, a Cartesian coordinate system with an x-axis 29, a y-axis 30 and a z-axis 31 is represented with the origin of the z-axis 31 in the plane of the undeformed first virtual surface 3, which would not be shown to the user.

In the area of the first virtual surface, a plurality of defined deformations 4 is shown, wherein the deformations 4 are respectively labelled with the reference number of the relevant finger as in FIG. 5. Based on the shape and position of the deformations, it is intuitively clear to the user that the deformation 4 in the representation at the bottom left is caused by the thumb 7. Also the deformation 4 on the top left by the index finger 8, the deformation 4 next to it by the middle finger 9, the deformation 4 next to that by the ring finger 10 and the deformation 4 on the far outer right by the little finger 11. Furthermore, the user can find from the representation that the deformations 4 of the index finger 8, middle finger 9 and ring finger 10 along the negative z-axis 31 are deeper than those of the thumb 7 and the little finger 11. In a virtual implementation, this is very much clearer to the user than the loss-free copyable representation of a single screenshot permits, because the user can be shown further aids, such as, for example, shadowing, directed or diffused reflections, blurring, 3D animations or similar, and furthermore a real-time change of the depth of the deformation 4 can be perceived, if the user moves his finger accordingly. In this example, then, a manipulation of the first surface 3 by means of fingers 8 to 10 is possible, which allows, for example, scrolling, rotating, tipping or pushing the page or zooming into the text. If the user cancels the contact caused by the deeper deformations 4 with fingers 8 to 10 by, for example, lifting these fingers in the positive direction along the z-axis 31, the first surface 31 can no longer be manipulated and all fingers 7 to 11 are able to slide relative to the first surface 3, for example, to one of buttons 38 or 39, which are then, for example, able to be operated by a movement in the negative direction along the z-axis 31, wherein the buttons 38 and 39, for example, are able to be moved after an activation with their entire virtual surface in the negative direction along the z-axis 31 and after an activation remain in the depressed position for display, as, for example, is shown for the second button 39. Preferably, a button 38 and/or 39 is arranged by overlapping with a pointer (represented here by a deformation) in a middle position between a released position (button 38) and an activated position (button 39), for example in the zero plane of the first surface 3, wherein preferably the relevant button does not contain any indentation, but in case of an extension of the usual representation of the pointer (deformation 4) in the region of the first surface 3 is represented as just this deformation 4.

With the invention represented here, an autarkic and intuitive operation, particularly for applications in the area of augmented reality, can be implemented without the user being prevented from doing his other. activities.

REFERENCE NUMBER LIST

1 Screen
2 Computer unit
3 Virtual surface
4 Defined deformation
5 Bank
6 Virtual object
7 First finger 8 Second finger
9 Third finger
10 Fourth finger
11 Fifth finger
12 Input device
13 Fastening device
14 Hand
15 Recording unit
16 Transmitter unit
17 First camera
18 Second camera
19 Wide angle objective lens
20 First infrared light emitter
21 Second infrared light emitter
22 Input unit
23 Accelerometer
24 Gyroscope
25 Marking
26 External detection device
27 System
28 Field of view
29 x-axis
30 y-axis
31 z-axis
32 Battery
33 Spectacle lens
34 Spectacle arm
35 HMD
36 External computer unit
37 GUI
38 First button
39 Second button

The invention claimed is:

1. A method of representing a virtual interaction on at least one screen by means of a computer unit having at least one processor configured to:
  display a virtual surface on the at least one screen;
  display at least one pointer of a position by means of a defined deformation of the virtual surface when the at least one pointer is located on the virtual surface;
  displace a previously defined deformation upon a corresponding displacement of the at least one pointer while the previously defined deformation is cancelled, wherein the at least one pointer is generated by means of an input device configured to perform a virtual application by means of the computer unit comprising at least the following components:
    a fastening device for fastening to a hand;
    a recording device for creating recording data of the relative position of at least one finger of a hand with respect to the input device and/or with respect to at least one further component of the hand and/or with respect to a real surface, if the activated input device is fastened to the hand by means of the fastening device;
    an internal computer unit for processing the recording data;
    a transmitter unit for sending the processed recording data of the computer unit, wherein by means of said recording data at least one corresponding virtual interaction can be generated by means of the internal and/or an external computer unit.

2. A method of representing a virtual interaction on at least one screen by means of a computer unit having at least one processor configured to:
  display a representation of a virtual surface on at least one screen associated with the computer unit, wherein the virtual surface comprises a coordinate system with an x-axis and a y-axis in the virtual surface and a z-axis pointing out of the virtual surface;
  display a representation of a position of at least one pointer by means of a defined deformation of the virtual surface, wherein the at least one pointer is located on the virtual surface, wherein this defined deformation comprises a three-dimensional extent in the x-direction, y direction and z-direction;
  follow particularly each displacement of the pointer in the x-direction and y-direction, continuously, real-time; and
  displace the defined deformation in the x-direction and y-direction in a corresponding fashion and cancelling the previously defined deformation.

3. A method of representing a virtual interaction on at least one screen by means of a computer unit having at least one processor configured to:
  display a representation of a virtual surface on the at least one screen;
  display a representation of a position of at least one pointer by means of a defined deformation of the virtual surface if the at least one pointer is located on the virtual surface, wherein this defined deformation is only used to indicate the position of the at least one pointer;
  follow particularly each defined displacement of the at least one pointer, continuously, real-time; and,
  displace the defined deformation in a corresponding fashion and cancelling a previously defined deformation.

4. The method according to claim 1, wherein the defined deformation is made by means of at least one finger.

5. The method according to claim 1, wherein a plurality of fingers respectively generates a defined deformation, and wherein by means of the plurality of fingers at least one virtual object can be grasped.

6. The method according to claim 1, wherein a plurality of virtual surfaces is provided that form at least one virtual object, wherein a plurality of pointers is provided that are displayed respectively by a defined deformation, wherein upon a corresponding change of at least one of the defined deformations, the virtual object can be manipulated.

7. The method according to claim 1, wherein a distance limit of the pointer to at least one surface is defined, wherein if the distance limit is undercut, the defined deformation is changed and when the pointer is displaced a virtual kinetic action on the surface is possible, and wherein when the distance limit is exceeded the virtual surface rests and a displacement of the pointer leads to a displacement of the defined deformation relative to the virtual surface.

8. An input device for a virtual application by means of a computer unit, which input device is designed as a ring, wherein the ring comprises at least the following components:
  a fastening device for fastening the ring to a finger with an accurate fit;
  a recording unit for generating recording data of the relative position of at least one finger of a hand with respect to the input device and/or with respect to at least one further component of the hand and/or with respect to a real surface, if the activated input device is fastened to the finger by means of the fastening device;
  an internal computer unit for processing the recording data;
  a transmitter unit for sending the processed recording data of the computer unit, wherein by means of said recording data at least one corresponding virtual interaction can be generated by means of the internal and/or an external computer unit.

9. The input device according to claim 8, wherein the recording unit is at least one camera with a pre-defined field of view, wherein by means of the field of view at least one finger of the hand can be detected, and wherein the at least one camera is configured to record images of natural surfaces, preferably by means of a wide angle objective.

10. The input device according to claim 8, wherein the input device further comprises at least one accelerometer and/or a gyroscope, by means of which spatial changes of position of the input device can be detected.

11. A system for representation and for interaction with a virtual surface, which comprises at least one of the following components:
at least one input device according to claim 8,
at least one screen for representing a virtual surface for visual detection;
At least one central computer unit for processing of recording data into a corresponding virtual interaction, wherein by means of the virtual interaction the at least one virtual surface can be manipulated.

12. A method for manipulation of a virtual surface by means of a system for representing and for interaction with a virtual surface, comprising at least one of the following components:
at least one screen for representing a virtual surface for visual detection;
at least one central computer unit for processing recording data into a corresponding virtual interaction, wherein by means of the virtual interaction the at least one virtual surface can be manipulated; and
at least one input device for a virtual application by means of a computer unit, wherein the input device comprises at least the following components:
a fastening device for fastening to a hand;
a recording unit for generating recording data of the relative position of at least one finger of a hand with respect to the input device and/or with respect to at least one further component of the hand and/or with respect to a real surface, if the activated input device is fastened to the hand by means of the fastening device;
an internal computer unit for processing the recording data;
a transmitter unit for sending the processed recording data of the computer unit, wherein by means of said recording data at least one corresponding virtual interaction can be created by means of the internal and/or an external computer unit, wherein the method exhibits at least the following steps:
recording at least one part of a finger by means of the input device fastened to a hand;
detection of the at least one part of the finger by means of a stored hand model;
detection of the relative position of the at least one part of the finger with respect to the input device and/or with respect to at least one part of a detected component of the hand and/or with respect to a real surface;
Comparison of the detected relative position with a movement model of the stored hand model;
Calculating of a relative position of the at least one finger;
Calculating a virtual interaction on the basis of the relative position of the at least one finger and/or a change of the relative position of the at least one finger.

13. The method according to claim 12, wherein a position limit relating to the position of a finger with respect to the input device, with respect to a real surface and/or with respect to a further input device is pre-defined and a finger is activated for virtual interaction if the position limit is undercut, and a finger is deactivated if the position limit is exceeded.

14. The method according to claim 12, wherein in case of a plurality of recorded fingers a virtual object can be contacted and/or manipulated.

15. The method according to claim 1, wherein the at least one pointer is generated using an input device designed as a ring, wherein the ring comprises at least the following components:
a fastening device for fastening the ring to a finger with an accurate fit;
a recording unit for generating recording data of the relative position of at least one finger of a hand with respect to the input device and/or with respect to at least one further component of the hand and/or with respect to a real surface, if the activated input device is fastened to the finger by means of the fastening device;
an internal computer unit for processing the recording data;
a transmitter unit for sending the processed recording data of the computer unit, wherein by means of said recording data at least one corresponding virtual interaction can be generated by means of the internal and/or an external computer unit.

16. The method of claim 1, wherein the at least one pointer is generated using a system for representation and for interaction with a virtual surface, which comprises at least one of the following components:
at least one input device;
wherein the input device is designed as a ring, wherein the ring comprises at least the following components:
a fastening device for fastening the ring to a finger with an accurate fit;
a recording unit for generating recording data of the relative position of at least one finger of a hand with respect to the input device and/or with respect to at least one further component of the hand and/or with respect to a real surface, if the activated input device is fastened to the finger by means of the fastening device;
an internal computer unit for processing the recording data;
a transmitter unit for sending the processed recording data of the computer unit, wherein by means of said recording data at least one corresponding virtual interaction can be generated by means of the internal and/or an external computer unit
at least one screen for representing a virtual surface for visual detection;
At least one central computer unit for processing of recording data into a corresponding virtual interaction, wherein by means of the virtual interaction the at least one virtual surface can be manipulated.

17. The method of claim 1, wherein the at least one pointer is generated using a method for manipulation of a virtual surface by means of a system for representing and for interaction with a virtual surface, comprising at least one of the following components:
at least one screen for representing a virtual surface for visual detection;
at least one central computer unit for processing recording data into a corresponding virtual interaction, wherein by means of the virtual interaction the at least one virtual surface can be manipulated; and at least one input device for a virtual application by means of a computer unit, wherein the input device comprises at least the following components:

a fastening device for fastening to a hand;

a recording unit for generating recording data of the relative position of at least one finger of a hand with respect to the input device and/or with respect to at least one further component of the hand and/or with respect to a real surface, if the activated input device is fastened to the hand by means of the fastening device;

an internal computer unit for processing the recording data;

a transmitter unit for sending the processed recording data of the computer unit, wherein by means of said recording data at least one corresponding virtual interaction can be created by means of the internal and/or an external computer unit, wherein the method exhibits at least the following steps:

recording at least one part of a finger by means of the input device fastened to a hand;

detection of the at least one part of the finger by means of a stored hand model;

detection of the relative position of the at least one part of the finger with respect to the input device and/or with respect to at least one part of a detected component of the hand and/or with respect to a real surface;

Comparison of the detected relative position with a movement model of the stored hand model;

Calculating of a relative position of the at least one finger;

Calculating a virtual interaction on the basis of the relative position of the at least one finger and/or a change of the relative position of the at least one finger.

18. Method according to claim 2, wherein the defined deformation corresponds to the shape and/or the size of a finger, a portion of a finger, such as a fingertip or a currently used finger.

19. Method according to claim 2, wherein the defined deformation is controlled by means of at least one finger.

20. Method according to claim 3, wherein the defined deformation corresponds to the shape and/or the size of a finger, a portion of a finger, such as a fingertip or a currently used finger.

21. Method according to claim 3, wherein the defined deformation is controlled by means of at least one finger.

* * * * *